May 19, 1942.     M. A. ZALIMENI     2,283,716
HITCH MECHANISM
Filed Sept. 23, 1939
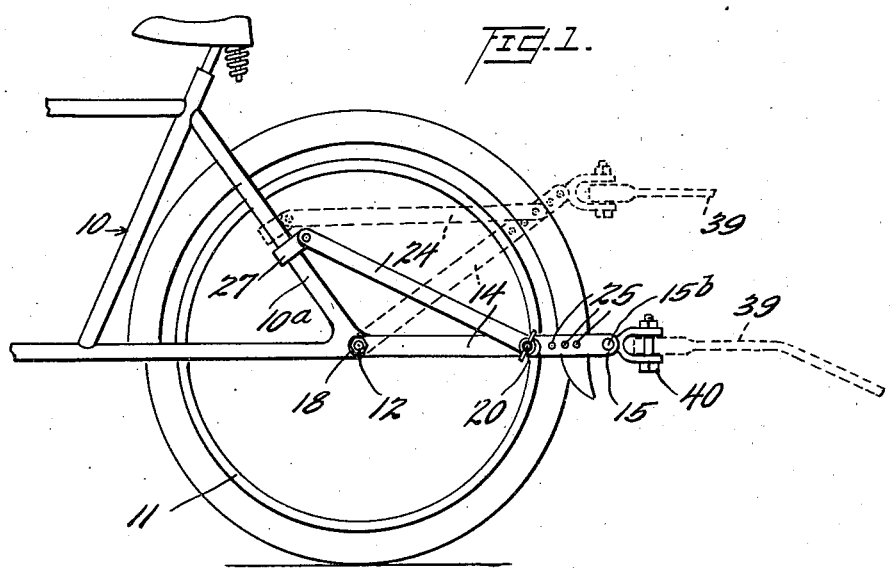
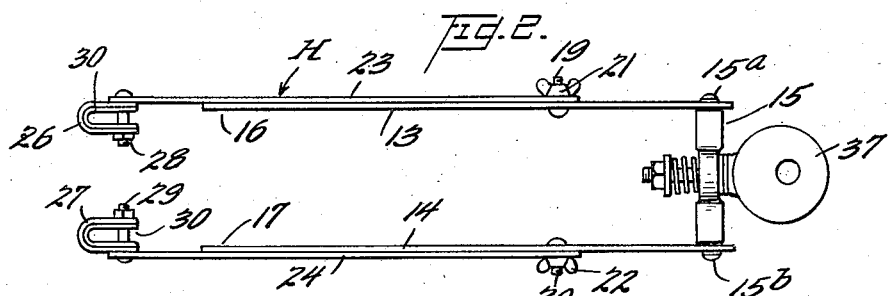
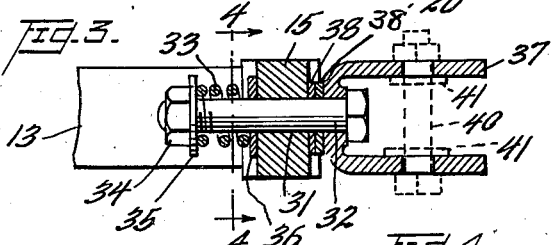
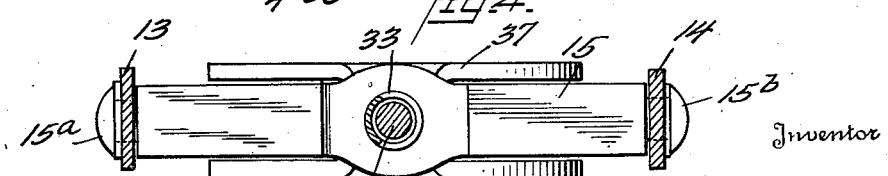
Inventor
Michael Antimo Zalimeni,
By Ivan P. Tashof,
Attorney Patented May 19, 1942

2,283,716

UNITED STATES PATENT OFFICE 2,283,716

HITCH MECHANISM

Michael Antimo Zalimeni, Ashtabula, Ohio

Application September 23, 1939, Serial No. 296,323

3 Claims. (Cl. 280—204)

The present invention relates to improvements in hitch attachments for the coupling of a trailer to the rear portion of a bicycle, motorcycle, or similar vehicle.

The attachment of small light weight multi-wheeled trailers to bicycles, motorcycles and similar vehicles which are normally driven at various angles with respect to the roadway surface, occasions the necessity for the employment of some form of swivel joint in the drive coupling or hitch in order to prevent shifts in angular disposition of the bicycle or motorcycle from being transmitted to such trailer which is normally maintained in a fixed angular disposition with respect to the roadway.

Bicycle and motorcycle trailers of the type of which the present invention is concerned vary considerably in the size of wheels employed and for this reason a desirable hitch must have some provision for adaptability to draft vehicles, the wheels of which may vary in size. The bodies of such trailers are intended to be maintained in the same horizontal plane as the roadway and the achievement of such a level body requires, in a universally adaptable hitch construction, the provision of some adjustable means to permit the hitch end of the draw-bar at a different elevation with respect to the roadway.

It is one of the objects of the present invention therefore to provide a hitch attachment for bicycles, motorcycles or similar vehicles which is readily adjustable in its attachment to the bicycle, motorcycle or other draft vehicle, whereby the desired leveling of the trailer body may be achieved.

Another object of the present invention is to provide a trailer hitch for bicycles, motorcycles and the like which is less likely to effect upsetting of the trailer or interference with normal balancing action in the draft vehicle.

Still another object of the present invention is to provide a trailer hitch for bicycles, motorcycles and other similar vehicles which is extremely simple in construction, being capable of manufacture from stock shapes and existing machinery and which is easy to install upon conventional draft vehicles.

Still another object of the present invention is to provide an attaching mechanism for a hitch which can be readily attached to the conventional frame construction and rear axle of a bicycle and when so attached may be raised or lowered at will.

Still another object of the invention is to provide clamp members for a vehicle hitch which may be attached to the rear fork of a bicycle by means of a resilient member so as not to injure the finish of said fork.

Other objects and advantages of the present invention will become apparent from the subsequent description and drawing of the device.

A preferred embodiment of the present invention is illustrated in the accompanying drawing in which:

Figure 1 is a side elevational view of the hitch attached to the rear axle and rear fork of a bicycle.

Figure 2 is a plan view of the hitch.

Figure 3 is a vertical cross sectional view of the swivel or universal joint assembly taken on line 4—4 of Figure 4.

Figure 4 is a rear view of the swivel or universal joint assembly.

Referring to Figures 1 and 2 of the accompanying drawing in which there is illustrated a preferred embodiment of the present invention as applied to a bicycle of conventional design, said bicycle comprising the usual tubular frame illustrated in part at 10 and a rear wheel 11 supporting said frame through the conventional axle 12. The hitch construction proper consists of a hitch member indicated in general at H and having a pair of strap members 13 and 14 adapted to be attached at their forward ends to opposed ends of the axle 12 and joined at their rear ends by a pintle 15. It is to be understood that the members 13 and 14 are pivoted to the pintle 15 in any suitable manner as indicated at 15a and 15b.

One of the means of attaching the straps 13 and 14 to the rear axle of the bicycle is the provision of openings indicated at 16 and 17 which are adapted to fit about the ends of the axle. A suitable nut 18 may be carried by the end of the axle and serves to prevent the ends of the straps from slipping off the axle end. Each of the straps 13 and 14 is detachably joined as by the bolts 19 and 20 and the wing nuts 21 and 22 to auxiliary strap members 23 and 24. The strap members 13 and 14 are provided with a plurality of holes which are indicated in general at 25 through which the bolts 19 and 20 extend for a purpose to be hereinafter set forth. Each of the auxiliary strap members 23 and 24 carries at its forward ends, clamps 26 and 27. The clamps 26 and 27 are attached to the auxiliary strap members 23 and 24 by the bolts 28 and 29 which permit the clamp members to be fixed at any angle to the auxiliary strap members. The clamps 26 and 27 are each adapted to fit about one of the tines of the rear fork of a bicycle. As shown in Figure 1, the clamp member 27 is assembled with the tine 10a of the rear fork. As shown in Figure 2, the clamps 26 and 27 are provided with a suitable padding material such as rubber and the like which is indicated at 30. This padding serves to prevent any damage to the finish of the rear fork of the bicycle as well as effecting a better connection between the clamp and the rear fork.

The pintle 15 has a central transverse aperture 31 to receive cap screw 32 upon which is assembled a shock absorber spring 33 by means of a nut 34 and thrust washers 35 and 36 interposed between the ends of the spring 33, the nut 34 and the pintle 15. A clevis member 37 is carried upon the cap screw 32 between its head and the pintle 15. A buffer washer 38 and a steel washer 38' are interposed between the otherwise abutted surface of the clevis 37 and the pintle 15 in order to form a shock proof connection. This buffer washer 38 may be formed of resilient rubber material or of a resilient rubber fabric composition well known in the art. The steel washer 38' decreases the normal friction between the clevis 37 and the resilient buffer washer 38.

The draw bar 39 is attached to the clevis member 37 by clevis bolt 40 and a suitable washer or washers 41 are disposed at each side of the draw bar 39 to facilitate the turning motion of the draw bar relative to the draft vehicle.

The connections just described constitute in effect a coupling joint between the hitch and the draw bar of a trailer and permits any twisting, turning, swaying or other motion necessary in the coupling during operation and parking of the draft vehicle and its attached trailer. The purpose of the holes 25 in the strap members 13 and 14 is to permit the effective positioning of the hitch relative to the trailer to be moved upwardly or downwardly. In other words, the present hitch is effective to hold up the front end of a suitable trailer but the position at which the trailer is held may be raised or lowered at will by shifting the connection between the strap members 13 and 14 and the strap members 23 and 24. When the effective position of the hitch is to be raised, the wing nuts 21 and 22 are loosened and the bolts 19 and 20 are moved to one of the holes 25 which is closer to the pintle 15, thus moving the pintle 15 in an upward direction. In Figure 1 the strap member and the pintle 15 are shown in a relatively low position in full lines and in a relatively high position in dotted lines. It is to be noted that in either of these positions, the front end of the trailer or the draw bar 39 is firmly held and is also permitted to rotate or twist in any direction relative to the bicycle.

I claim:

1. In a hitch mechanism, a pair of strap members adapted to fit on each side of a bicycle rear axle, each of said strap members being pivoted at one end on opposed ends of the said axle and being pivotally connected at each of their other ends by a pintle, a bolt extending through the central portion of the pintle and resiliently coupled thereto, a clevis carried by the bolt and connected to said pintle for rotational movement relative thereto, and means to rotatably connect the end of a trailer draw bar within said clevis member.

2. In a hitch mechanism, a pair of strap members adapted to fit on each side of a bicycle rear axle, each of said strap members being pivoted at one end on opposed ends of the said axle and being pivotally connected at each of their other ends by a pintle, a bolt extending through the central portion of the pintle and resiliently coupled thereto, a clevis carried by the bolt and connected to said pintle for rotational movement relative thereto, means to rotatably connect the end of a trailer draw bar within said clevis member, an additional pair of strap members, means to pivotally connect the forward ends of each of said second strap members to each of the tines of a bicycle rear fork and means to adjustably connect the rearward ends of each of said second strap members to the first strap members.

3. In a hitch member for bicycles, tricycles and other draft vehicles, a trailer supporting member having its forward end pivoted to the rear axle of a bicycle, a pintle pivoted to said supporting member at each of its ends, a flattened central portion on said pintle provided with a transverse aperture, a pair of ears extending from the clevis and adapted to turnably receive a vehicle draft bar, a cap screw extending through the base of said clevis and the aperture of said pintle, a shock absorbing member bearing against said cap screw, an auxiliary supporting member adjustably connected to the first mentioned supporting member adjacent its rearward end and movable forwardly and rearwardly along said first supporting member as the rear end of said member is raised or lowered, a clamp conforming in shape to one of the tines of the bicycle fork and fitted on said tine normal to the longitudinal axis thereof and means to pivotally connect said clamp and the forward end of said auxiliary supporting member.

MICHAEL ANTIMO ZALIMENI.